(12) United States Patent
Wittenschlaeger

(10) Patent No.: US 9,917,728 B2
(45) Date of Patent: Mar. 13, 2018

(54) SOFTWARE-BASED FABRIC ENABLEMENT

(71) Applicant: Nant Holdings IP, LLC, Culver City, CA (US)

(72) Inventor: Thomas Wittenschlaeger, Flowery Branch, GA (US)

(73) Assignee: Nant Holdings IP, LLC, Culver City, CA (US)

(\*) Notice: Subject to any disclaimer, the term of this patent is extended or adjusted under 35 U.S.C. 154(b) by 339 days.

(21) Appl. No.: 14/595,747

(22) Filed: Jan. 13, 2015

(65) Prior Publication Data
US 2015/0200809 A1     Jul. 16, 2015

Related U.S. Application Data

(60) Provisional application No. 61/927,321, filed on Jan. 14, 2014.

(51) Int. Cl.
*H04L 12/24*     (2006.01)
*H04L 29/08*     (2006.01)
(Continued)

(52) U.S. Cl.
CPC .... *H04L 41/0806* (2013.01); *H04L 29/08009* (2013.01); *H04L 29/08099* (2013.01);
(Continued)

(58) Field of Classification Search
CPC .................. H04L 29/08009–29/08099; H04L 29/08135–29/08144;
(Continued)

(56) References Cited

U.S. PATENT DOCUMENTS

| 4,802,220 A | 1/1989 | Marker, Jr. |
| 5,361,334 A | 11/1994 | Cawley |

(Continued)

FOREIGN PATENT DOCUMENTS

| EP | 1 236 360 B1 | 11/2008 |
| WO | WO/2002/046944 A2 | 6/2002 |

OTHER PUBLICATIONS

M. Chiang, "Balancing Transport and Physical Layers in Wireless Multihop Networks: Jointly Optimal Congestion Control and Power Control", IEEE Journal on Selected Areas in Communications, vol. 23, No. 1, Jan. 2005.

(Continued)

*Primary Examiner* — Eric Myers
(74) *Attorney, Agent, or Firm* — Steven J Shattil

(57) ABSTRACT

A first fabric abstraction layer couples to a data link layer and a physical layer of a network fabric device. The network fabric device is connected to other network elements within a network via at least one network connection, such as a fiber optic connection. A second fabric abstraction layer couples to the data link layer and an application of the network device. The second fabric abstraction layer provides an application programming interface (API) to the application. The API allows the application to generate configuration instructions for configuring the at least one network connection. Upon receiving the configuration instructions generated by the application, the second abstraction layer sends the configuration instructions to the first abstraction layer via the data link layer. The first abstraction layer then configures the at least one network connection to transmit data according to the configuration instructions.

16 Claims, 9 Drawing Sheets

(51) Int. Cl.
*H04L 12/801* (2013.01)
*H04L 12/937* (2013.01)

(52) U.S. Cl.
CPC ............ *H04L 47/19* (2013.01); *H04L 49/253* (2013.01); *H04L 69/329* (2013.01)

(58) Field of Classification Search
CPC ........ H04L 29/08576–29/08639; H04L 47/19; H04L 49/25–49/251; H04L 49/253–49/255; H04L 69/329
See application file for complete search history.

(56) References Cited

U.S. PATENT DOCUMENTS

| | | | |
|---|---|---|---|
| 6,041,117 | A | 3/2000 | Androski et al. |
| 6,105,122 | A | 8/2000 | Muller et al. |
| 6,160,819 | A | 12/2000 | Partridge et al. |
| 6,671,256 | B1 | 12/2003 | Xiong et al. |
| 6,771,597 | B2 | 8/2004 | Makansi et al. |
| 6,779,016 | B1 | 8/2004 | Aziz |
| 6,876,663 | B2 | 4/2005 | Johnson et al. |
| 6,941,252 | B2 | 9/2005 | Nelson et al. |
| 6,965,615 | B1 | 11/2005 | Kerr et al. |
| 6,970,085 | B2 | 11/2005 | Okabe et al. |
| 6,993,010 | B1 | 1/2006 | Peshkin |
| 7,010,590 | B1 | 3/2006 | Munshi |
| 7,013,335 | B2 | 3/2006 | Barnhouse et al. |
| 7,061,935 | B1 | 6/2006 | Roy et al. |
| 7,092,999 | B2 | 8/2006 | Levitan |
| 7,111,163 | B1 | 9/2006 | Haney |
| 7,171,492 | B1 | 1/2007 | Borella |
| 7,181,541 | B1 | 2/2007 | Burton et al. |
| 7,185,062 | B2 | 2/2007 | Lolayekar et al. |
| 7,203,736 | B1 | 4/2007 | Burnett et al. |
| 7,233,590 | B2 | 6/2007 | Beshai |
| 7,263,089 | B1 | 8/2007 | Hans et al. |
| 7,289,509 | B2 | 10/2007 | Brown et al. |
| 7,307,995 | B1 | 12/2007 | Iyer et al. |
| 7,337,209 | B1 | 2/2008 | Barkai et al. |
| 7,406,038 | B1 | 7/2008 | Oelke et al. |
| 7,499,468 | B2 | 3/2009 | Montgomery, Jr. |
| 7,548,545 | B1 | 6/2009 | Wittenschlaeger |
| 7,548,556 | B1 | 6/2009 | Wittenschlaeger |
| 7,561,571 | B1 | 7/2009 | Lovett et al. |
| 7,570,579 | B2 | 8/2009 | Oran |
| 7,707,309 | B2 | 4/2010 | Shanbhag et al. |
| 7,760,717 | B2 | 7/2010 | Atkinson |
| 7,761,923 | B2 | 7/2010 | Kuhti et al. |
| 7,903,684 | B2 | 3/2011 | Lee et al. |
| 7,904,602 | B2 | 3/2011 | Wittenschlaeger |
| 2002/0097725 | A1 | 7/2002 | Dighe et al. |
| 2002/0159437 | A1 | 10/2002 | Foster et al. |
| 2003/0005039 | A1 | 1/2003 | Craddock et al. |
| 2003/0069922 | A1 | 4/2003 | Arunachalam |
| 2003/0101426 | A1 | 5/2003 | Sarkinen et al. |
| 2003/0128706 | A1 | 7/2003 | Mark et al. |
| 2003/0185148 | A1 | 10/2003 | Shinomiya et al. |
| 2003/0202520 | A1 | 10/2003 | Witkowski et al. |
| 2003/0206528 | A1 | 11/2003 | Lingafelt et al. |
| 2003/0229780 | A1 | 12/2003 | Reamer |
| 2004/0032874 | A1 | 2/2004 | Fujiyoshi |
| 2004/0083361 | A1 | 4/2004 | Noble et al. |
| 2004/0153707 | A1 | 8/2004 | Ellerbrock et al. |
| 2004/0210632 | A1 | 10/2004 | Carlson et al. |
| 2005/0091341 | A1 | 4/2005 | Knight et al. |
| 2006/0045273 | A1 | 3/2006 | Mayer |
| 2006/0156404 | A1 | 7/2006 | Day |
| 2006/0171301 | A1 | 8/2006 | Casper et al. |
| 2007/0061434 | A1 | 3/2007 | Schmieder et al. |
| 2007/0076599 | A1 | 4/2007 | Ayyagari et al. |
| 2007/0076603 | A1 | 4/2007 | MeLampy et al. |
| 2007/0091907 | A1 | 4/2007 | Seshadri et al. |
| 2007/0115806 | A1 | 5/2007 | Onorato et al. |
| 2007/0253329 | A1 | 11/2007 | Roohalamini et al. |
| 2007/0286198 | A1 | 12/2007 | Muirhead et al. |
| 2007/0288896 | A1 | 12/2007 | Lee |
| 2008/0101367 | A1 | 5/2008 | Weinman |
| 2008/0235365 | A1 | 9/2008 | Bansai |
| 2008/0273486 | A1 | 11/2008 | Pratt et al. |
| 2010/0040053 | A1 | 2/2010 | Gottumukkula et al. |
| 2010/0082513 | A1 | 4/2010 | Liu |
| 2010/0103837 | A1 | 4/2010 | Jungck et al. |
| 2010/0136987 | A1 | 6/2010 | Kim et al. |
| 2010/0211665 | A1 | 8/2010 | Raza et al. |
| 2011/0032814 | A1* | 2/2011 | Wen ..................... H04L 49/254 370/217 |
| 2011/0134924 | A1 | 6/2011 | Hewson et al. |
| 2011/0310899 | A1 | 12/2011 | Alkhatib et al. |
| 2012/0023545 | A1 | 1/2012 | Qu |
| 2012/0093047 | A1 | 4/2012 | Khawer et al. |
| 2012/0166601 | A1 | 6/2012 | Wittenschlaeger |
| 2013/0019280 | A1 | 1/2013 | Larson et al. |
| 2013/0101291 | A1 | 4/2013 | Wittenschlaeger |
| 2013/0279909 | A1 | 10/2013 | Srinivas et al. |
| 2014/0013027 | A1 | 1/2014 | Jannyavula Venkata et al. |

OTHER PUBLICATIONS

E. Baik, et al., "Cross-layer Coordination for Efficient Contents Delivery in LTE eMBMS Traffic", Mobile Adhoc and Sensor Systems (MASS), 2012 IEEE 9th International Conference on, Oct. 8-11, 2012, pp. 398-406, Las Vegas, NV.

"Nova: Network Obfuscation and Virtualized Anti-reconnaissance System" DataSoft Brochure, www.datasoft.com, Doc.Revision NS011302, 2013.

D.E. Ott, et al., "Transport-level Protocol Coordination in Cluster-to-Cluster Applications", Interactive Distributed Multimedia Systems Lecture Notes in Computer Science, vol. 2158, 2001, pp. 10-22, Aug. 24, 2001.

J. Macauley, "DRAC Layer 0/1/2 Control Controlling bandwidth to the edge", Encore Presentation: 2010 OpenDRAC developers workshop, Utrecht NL.

Fujitsu, "Inter-cloud data security technology developed by Fujitsu", Physorg.com, Oct. 19, 2010, http://phys.org/news/2010-10-inter-cloud-technology-fujitsu.html.

* cited by examiner

SOFTWARE-BASED FABRIC ENABLEMENT

CROSS REFERENCE TO RELATED APPLICATIONS

This application claims the benefit of priority to U.S. provisional application 61/927,321 filed Jan. 14, 2014. This and all other extrinsic references referenced herein are incorporated by reference in their entirety.

FIELD OF THE INVENTION

The field of the invention is management and provisioning of network fabrics.

BACKGROUND

The background description includes information that may be useful in understanding the present invention. It is not an admission that any of the information provided herein is prior art or relevant to the presently claimed invention, or that any publication specifically or implicitly referenced is prior art.

Computer networks continue to grow in size and complexity to service the ever growing communication demands of their users. Recent developments in network fabrics have allowed dramatic increases in data throughput and reduction of transmission latency over conventional network topologies (or infrastructures). A network fabric is a type of network infrastructure that is formed by connecting at least two devices (e.g., edge devices) via multiple network nodes (or switches). These network nodes are usually connected with one another via optical links (e.g., optical fibers). In addition, the interconnected network nodes can form more than one physical path between each pair of edge devices, allowing data to be transmitted among the multiple physical paths in parallel to generate better total data throughput (i.e., the amount of data being transmitted from one edge device to another edge device within a period of time) and lower transmission latency (i.e., the amount of time for data to be transmitted from one device to another). Therefore, network fabrics have become the preferred network structure for organizations with offices that are spread out geographically and that demand high data transfer speed.

The greater throughput of network fabrics also allows them to provide a network for distributed computers. Example computing fabrics include Beowulf clusters and parallel virtual machines (PVM) developed by the University of Tennessee, Oak Ridge National Laboratory and Emory University. U.S. Pat. No. 6,779,016 to Aziz et al. titled "Extensible Computing System" also describes using a networking fabric to create a virtual server farm out of a collection of processors and storage elements.

While network fabrics generally have better data throughput and lower latency than conventional network structure, the data transmission efficiency is far from being optimized. Specifically, it has been found that the channels within each physical network link are not optimally utilized most of the time. In addition, as the number of network elements increases, it is becoming more difficult to provide efficient data transmission due to the lack of a world view within each network node. Network fabrics supporting multiple logical data paths through the fabric from one host to another exacerbates communication latency issues because of the numerous logical structures (e.g., routes or data paths), which may potentially be a part of the data flow path of the network bus.

Efforts have been made to improve the utilization efficiency of network fabrics. For example, InfiniBand® (http://www.infinibandta.org/home) provides high speed fabric connectivity among High Performance Computing (HPC) systems while having moderately low latency. Unfortunately, InfiniBand and other HPC networks are limited to communicating over a distance less than several hundred meters rendering them unsuitable for network environments spanning across geographically significant distances. Additionally, such networks at best can only connect computer systems or some peripherals, but not all network elements.

U.S. Pat. No. 6,105,122 to Muller et al. titled "I/O Protocol for Highly Configurable Multi-Node Processing System" discusses transferring data from computer nodes to I/O nodes through a fabric of switch nodes. While useful for communicating among edge nodes, the configuration described by Muller still does not address the desire for having an efficient port-to-port network communication.

E.P. 1,236,360 to Sultana et al. titled "Integrating Signaling System Number 7 (SS7) Networks with Networks Using Multi-Protocol Label Switching (MPLS)" describes a label switching technique that provides for an abstraction layer between network layer protocols and link layer protocols. Although Sultana provides for reducing the amount of time and computational resources of forwarding data packets among fabric nodes, Sultana does not provide for application layer control over or flexibility in allocating data packets among network nodes.

U.S. patent publication 2003/0005039 to Craddock et al. titled "End Node Partition Using Local Identifiers" discloses a distributed computing system having components including edge nodes, switches, and routers that form a fabric that interconnects the edge nodes. The disclosed fabric employs InfiniBand to form the fabric. However, Craddock also does not address the need to provide application layer control over data flow allocation among the elements of a network fabric.

Thus, there is still a need for further improving on the efficiency of network fabrics.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY

The disclosure provides for apparatus, systems, and methods of configuring a networking fabric by a software application within a network device. In one aspect of the invention, a method of provisioning a network fabric is presented. The method comprises the step of providing a first fabric abstraction layer that couples to a data link layer and a physical layer of a network fabric device. The network fabric device is connected to other network elements within a network via at least one network connection, such as a fiber optic connection. The method also comprises the step of providing a second fabric abstraction layer that couples to the data link layer and an application of the network device. The second fabric abstraction layer then provides an application programming interface (API) to the application. The API allows the application to generate configuration instructions for configuring the at least one network connection. Upon receiving the configuration instructions generated by the application, the second abstraction layer sends the configuration instructions to the first abstraction layer via the data link layer. The first abstraction layer then configures the at least one network connection to transmit data according to the configuration instructions.

Various objects, features, aspects and advantages of the inventive subject matter will become more apparent from the following detailed description, along with the accompanying drawing figures in which like numerals represent like components.

BRIEF DESCRIPTION OF THE DRAWING

In the following description, various aspects are described with reference to the following drawings, in which.

DETAILED DESCRIPTION

It should be noted that any language directed to a computer should be read to include any suitable combination of computing devices, including servers, interfaces, systems, databases, agents, peers, engines, modules, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions configure the computing device to provide the roles, responsibilities, or other functionality as discussed below with respect to the disclosed apparatus. In exemplary embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Figure 1:
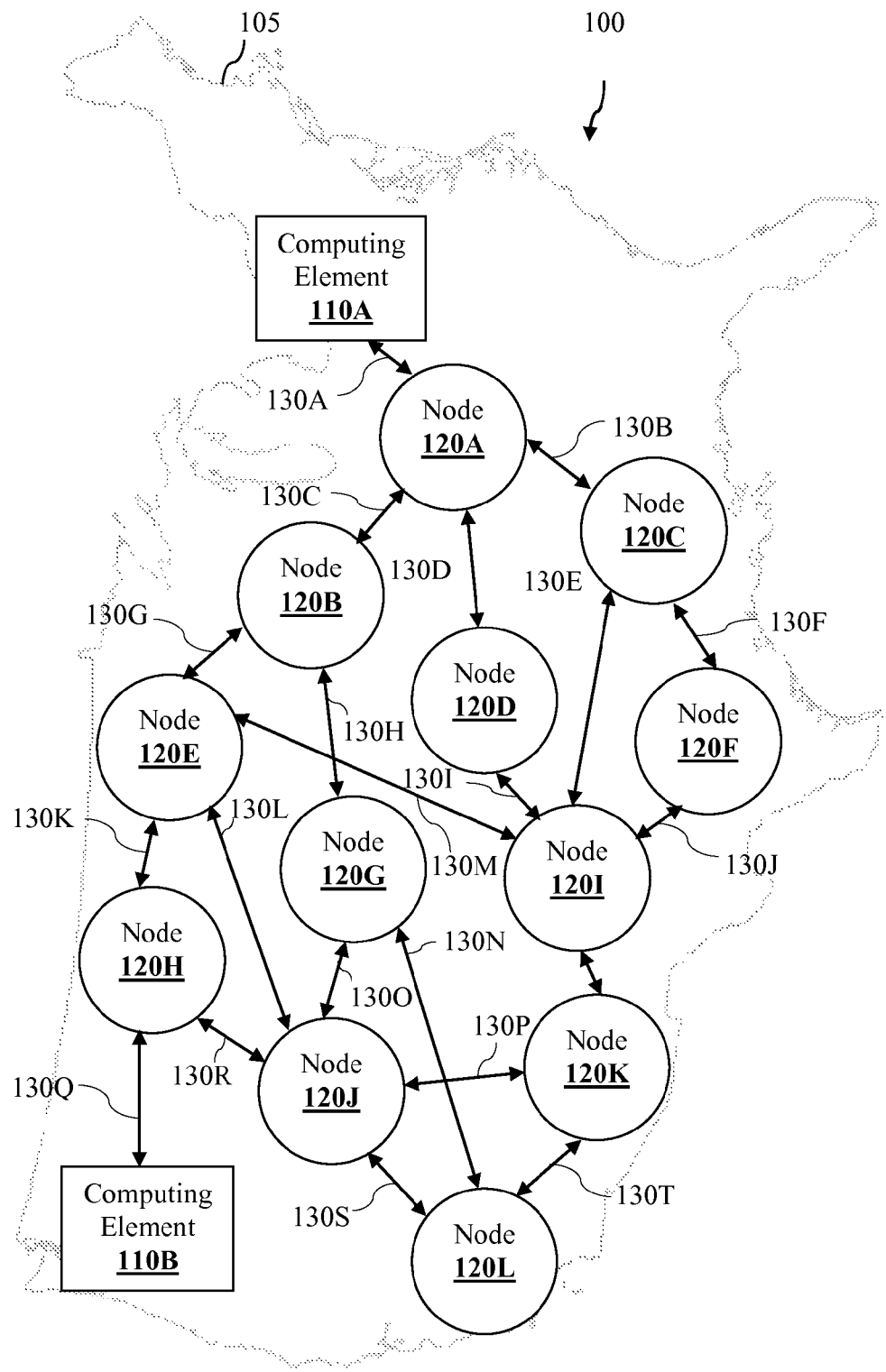
FIG. 1 illustrates a network of elements distributed over a geographical region.

FIG. 1 illustrates a network of elements 100 that can be geographically dispersed over a region 105. As shown, the network 100 includes two computing elements 110A and 110B that are located in the far ends of the region 105. The network 100 also includes twelve network nodes 120A through 120L (collectively, nodes 120). The computing elements 110A and 110B are interconnected through a plurality of physical communication links (130A through 130T, collectively referred to as nodes 130) connecting neighboring network nodes 120 that may be geographically separated. In some embodiments, network nodes 120 can be separated over geographically significant distances greater than five kilometers (km). Furthermore, network 100 allows computing elements 110A and 110B to communicate with each other via the network nodes 120 and links 130 even when the computing elements are geographically separated by 5 km, 10 km, or greater distances. In some embodiments, the network 100 is part of the National LamdaRail (NLR) high-speed network infrastructure.

Computing elements 110A or 110B can include devices or functional portions of a device. Contemplated devices include computers, servers, set-top boxes appliances, personal data assistant (PDA), cell phones, or other computing devices. Contemplated functional portions of a device include processors, memory, peripherals, displays, or other device components. In some embodiments, device components are adapted via one or more network interfaces allowing the component to communication over fabric 100. Computing elements 110 can also include other forms of networking infrastructure including routers, bridges, gateways, access points, repeaters, or other networking devices offering interconnectivity.

In some aspects, each of the links 130 is a physical point-to-point communication link, such as an optical fiber connection link, between two connected neighboring elements. In an exemplary fabric, each physical link 130 can support multiple physical data channels. First, some latest devices that provide layer 0/1 (physical layer within the OSI model) (e.g., Ciena® 6500 series, Tellabs® 7100 series, etc.) services can support transmission of data via up to eighty-eight (88) different optical wavelengths using wavelength-division multiplexing (WDM) technologies, thereby creating 88 different channels for data transmission. In addition, these layer 0/1 devices can also adopt a time-division multiplexing technology to create more channels by dividing the optical link into multiple time divisions. In these embodiments, each time division will carry the 88 wavelength channels, such that if the layer 0/1 device divides the optical link into 10 different time divisions, the layer 0/1 device can support up to 880 different physical channels. In some embodiments, each of these physical channels has a bandwidth no less than one hundred gigabits/second (100 Gb).

Each of the nodes 120A-120 L may include networking infrastructure equipment, such as routers, gateway, switches, hubs, or other devices that provide data transport. Each node 120 may comprise several ingress and egress ports used to route data packets from one node to another. The ports of the node provide physical connections to adjacent nodes. In some embodiments, ports are bi-directional allowing data traffic to flow into and out of the same physical port. Nodes 120 are contemplated to comprise memory to store data and software instructions in support of executing a computational function. Contemplated memory includes RAM, Flash, magnetic storage (e.g., a disk drive), solid state drives, race track memory, or other forms of data storage.

As mentioned, nodes 120 are also contemplated to include a processing element capable of executing more than one processing thread or task. Exemplary processing units comprise multi-core processors including the Intel® Quad Core processor product line. A multi-core processor allows node 120 to execute desired computational functions related to packet management and routing duties. One should appreciate that any processor having sufficient computing power would be equally suitable for deployment in nodes 120. Other contemplated processors include those developed by MIPS, AMD, Sparc, ARM, Freescale, Transmeta, Broadcom 568xx series, Broadcom 566xx series, Broadcom 565xx series, or other vendors or designers. In accordance with some aspects of the invention, each of the nodes 120A-120L has sufficient processing power and memory to perform other computational processes in addition to routing data packets.

Although network 100 is illustrated across the region 105 (e.g., the United States), it should be noted that network 100 could also comprise a world spanning network, the Internet for example. Alternatively, network 100 can be embodiment by a local area network, any packet switched network, an intranet, or even a small office or home network.

In some embodiments, a user or a computer process having access to network 100 can configure and provision a network fabric using a network fabric provisioning application by specifying a network fabric configuration to the network fabric provisioning application. The network fabric configuration can be an ad-hoc configuration, or a configuration that is based on a particular template that is a priori defined for a specific usage (e.g., a security template for ensuring secure transmission of data within the fabric, a database template for saving and retrieving data within the fabric, a computational template that is configured to optimize computation efficiency, etc.). The computer process can either have access to the network fabric provisioning application or be part of the network fabric provisioning application. The network fabric provisioning application can reside on any one of the network devices (computing edges 110A and 110B or nodes 120A-120L).

Figure 2:
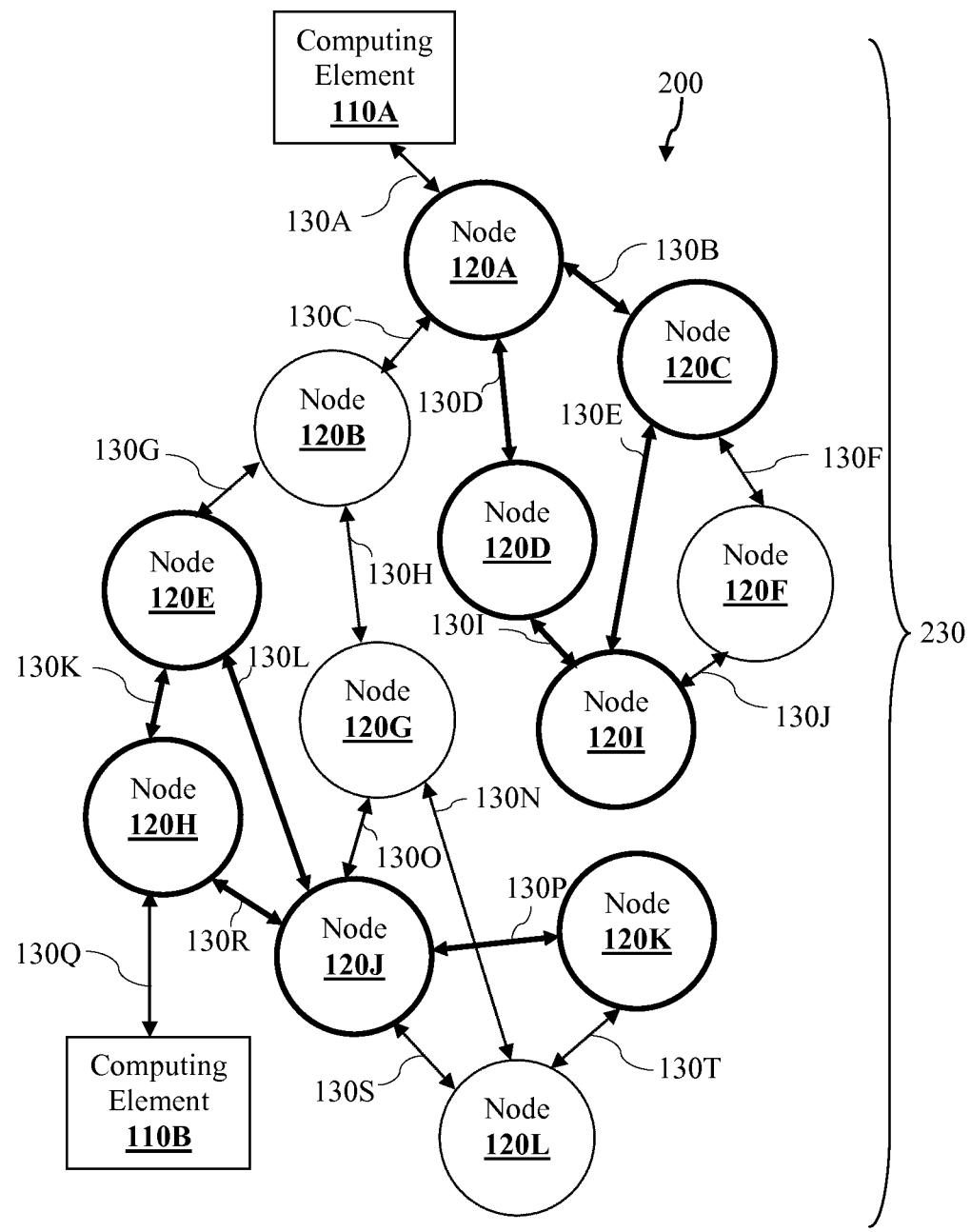
FIG. 2 illustrates an exemplary network fabric that is provisioned from multiple network elements according to a network fabric configuration.

In some embodiments, a network fabric configuration specifies a subset of the network elements in the network 100 and multiple paths through the subset of network elements to connect computing elements 110A and 110B. Network fabrics can include fabrics for internetworking, storage area networks, mesh networks, peer-to-peer networks or other network fabrics. FIG. 2 illustrates an example network fabric 200 that is provisioned from network elements of the network 100 according to a network fabric configuration.

Network fabric 200 is provisioned to have a specific configuration of nodes and links within the network 100. In this example, network fabric 200 is provisioned to include nodes 120A, 120C, 120D, 120E, 120H, 120I, 120J, and 120K (indicated by thick solid lines around the nodes). In addition, network fabric 200 is provisioned to also include the links 130B that connects nodes 120A and 120C, link 130D that connects nodes 120A and 120D, link 130E that connects nodes 120C and 120I, link 130I that connects nodes 120D and 120I, link 130M that connects nodes 120E and 120I, link 130K that connects nodes 120E and 120H, link 130L that connects nodes 120E and 120J, link 130R that connects nodes 120H and 120J, and link 130P that connects nodes 120J and 120K (indicated by thick solid lines).

Because a network fabric requires cooperation from multiple network nodes to routes data packets between pairs of computing elements in a specific manner, the network fabric application in some embodiments, could distribute information about the network fabric configuration to the other network nodes within the fabric 230, such that each of the network node in the fabric 230 has full knowledge of the fabric. In some embodiments, the information (including the network fabric configuration) is encapsulated within an image file before distributing the image file across the network nodes within the fabric. This distribution of fabric knowledge also allows any fabric to take over the management function when one or more of the node has gone down during the lifespan of the fabric 230.

As shown, the provisioned network fabric 200 provides multiple paths between computing edges 110A and 110B. For example, network fabric 200 provides a first path between computing edges 110A and 110B through nodes 120A, 120D, 120I, 120E, and 120H. The network fabric 200 also provides a second path between computing edges 110A and 110B through nodes 120A, 120C, 120I, 120E, 120J and 120H.

Thus, data packets sent from computing edge 110A could travel along a route defined by nodes 120 "ACIEJH", or alternatively along a route defined by nodes 120 "ADIKH" where the routes differ from each other by at least one of physical links 130. In an exemplary embodiment, the routes are configured to transport data between computing edges 110A and 110B with low latency or a high throughput.

Creating multiple routes within network fabric 200 provides numerous advantages. One advantage includes providing fault tolerance in communications between elements 110A and 110B. Should a route fail due to a lost node or failed link, data packets can be rerouted through other alternative paths. In a distributed core fabric, such rerouting of data packets occurs in a substantially transparent fashion with respect to the computing elements 110. An additional advantage of multiple routes includes increased throughput across network fabric 200. Data from element 110A can be divided into data chunks by node 120A and sent through different routes selected from the multiple routes to element 110B. Sending data chunks across multiple routes within network fabric 200 increases the parallelism of the data transport effectively increasing throughput from node 120A to node 120H. Additionally, sending data chunks across multiple routes increases security of the data transmission by spreading the chunks across geographically distributed paths in a manner where it becomes impractical for a threat to monitor all links to reconstruct the payload data. More information about network fabric can be found in U.S. Pat. No. 7,548,545 to Wittenschlaeger entitled "Disaggregated Network Management", filed May 13, 2008, U.S. Pat. No. 7,904,602 to Wittenschlaeger entitled "Distributed Computing Bus", filed May 16, 2008, U.S. Pat. No. 7,548,556 to Wittenschlaeger entitled "Secure Communication Through a Network Fabric", filed Jun. 25, 2008, and co-pending U.S. application Ser. No. 13/024,240 entitled "Distributed Network Interfaces for Application Cloaking and Spoofing", filed Feb. 9, 2011. These publications are herein incorporated by reference.

Figure 3:
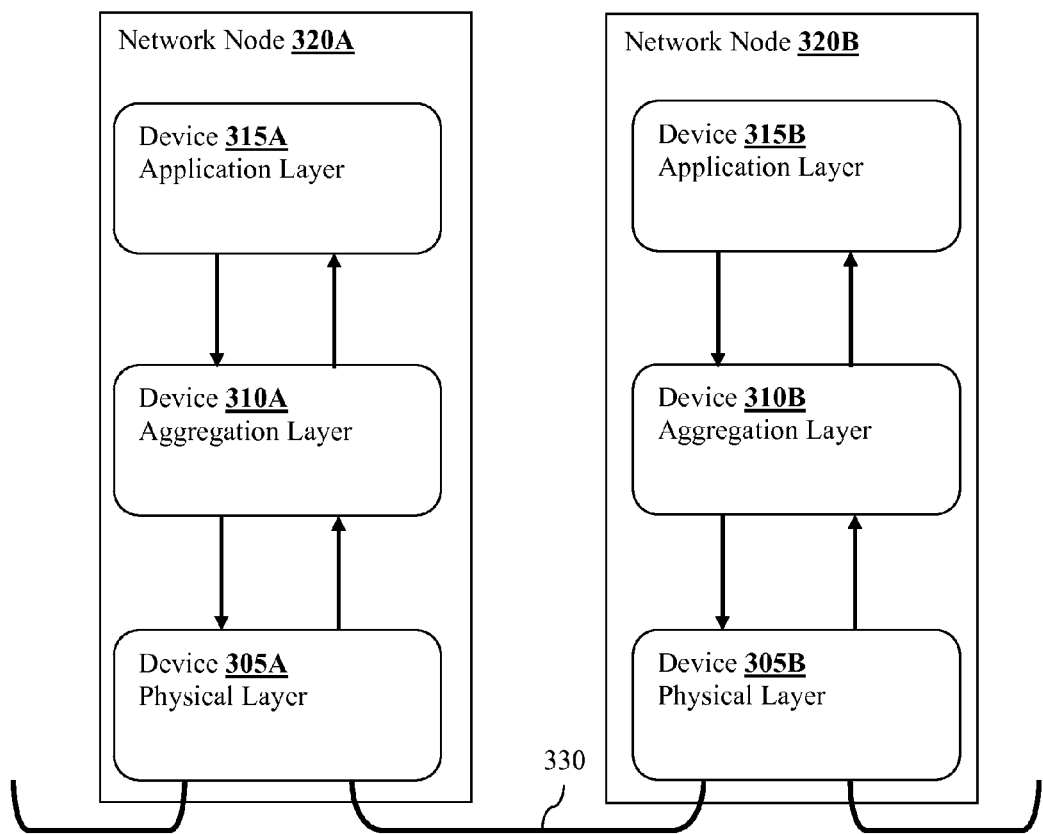
FIG. 3 illustrates exemplary network nodes connected with each other via a link.

FIG. 3 illustrates examples of network nodes 320A and 320B that are connected with each other via a link 330. Nodes 320A and 320B can be any nodes within the network 100. In some embodiments, each of the network nodes 320A and 320B includes at least two sub-devices. Conventionally, each of the nodes 320A and 320B is implemented by at least one rack of equipments. The rack of equipments can include multiple stand-alone (independently operated) devices. Each of these devices implements functionalities and features according to one or more network layers of the OSI model, possibly other network communication models or stacks. In some embodiments, each of the devices is a self-contained device that includes software and hardware (e.g., processors, memory, etc.) that implements functionalities and features according to one or more network layers of the OSI model. The devices do not share any resources with each other and may communicate with each other only via their ports and external links. The self-contained devices in each node can be even physically separated from each other.

In this example, network node 320A has a rack of equipments that comprises devices 305A, 310A, and 315A, while network node 320B comprises devices 305B, 310B, and 315B. Devices 305A and 305B can be configured to perform networking functionalities according to the physical layer (layers 0/1) of the OSI model, such as media, signal, and bits transmission functionalities. Examples of this kind of devices include hubs, repeaters, network interface cards, etc. (e.g., Ciena® 8500 series and Tellabs® 7100 series).

Devices 310A and 310B can be configured to perform networking functionalities according to an aggregated layer that includes the data link layer, network layer, and transport layer (layers 2/3/4) of the OSI model. The networking functionalities performed by these devices include physical addressing functionalities, path determination and logical addressing functionalities, and end-to-end connection and reliability functionalities. Examples of this type of devices include bridges, switches, routers, Ethernet cards, etc. (e.g., Summit® x450a series and Apcon® IntellaPatch series 3000).

In addition to the devices that implement layers 0/1 and layers 2/3/4 of the OSI model, nodes 320A or 320B can also include other devices that performs higher level networking functionalities according to the session layer, presentation layer, and/or application layer of the OSI model. For example, FIG. 3 shows that nodes 320A and 320B also has devices 315A and 315B respectively that performs networking functionalities according to the session layer, presentation layer, and application layers. The networking functionalities performed by these devices include ensuring that all necessary system resources are available, matching the application to the appropriate application protocol, synchronizing the transmission of data from the application to the application protocol. Examples of this type of devices include web servers, e-mail servers, voice-over-IP server, etc.

In some embodiments, each of the nodes 320A and 320B has sufficient resource (e.g., processing power, memory, etc.) such that these nodes are capable of performing other computation processes in addition to performing the networking functionalities that have been described above. In these embodiments, nodes 320A and 320B can also act as both network nodes and computing elements. When most or all of the network nodes within the network fabric 200 have these capabilities, these nodes can work in concert to provide a distributed computing server, load balancing server, or other types of distributed computing units for the network fabric 200.

As shown, adjacent nodes 320A and 320B connect to each other through one or more physical communication links 330. Links 330 can be wired or wireless. Exemplary links include optic fiber links capable of transporting data over geographically significant distances. For example, a single mode optic fiber can support transmission of data up to 40 Km at a wavelength of 1550 nanometers (nm) with a throughput of 10 Gbps. An additional example of a fiber optic link includes those under development by the IEEE 802.3 Higher Speed Study Group. The contemplated fibers support bandwidths from 40 Gbps to 100 Gbps over distances up to 40 Km using a single mode optical fiber.

In one aspect of the invention, the network fabric application for provisioning a network fabric within the network 100 can be provided within each of nodes 320A and 320B. In some embodiments, the network fabric application is a software application that couples to the application layer within the OSI model. In exemplary embodiments, the network fabric provisioning application is implemented within the application layer or above the application layer of the network device according to the OSI model. In some embodiments, the network fabric provisioning application is part of the operating system of the network device or part of an Ethernet driver of the network device.

It is contemplated that certain information about the network 100 might be necessary for the network fabric application to efficiently provision a network fabric within the network 100. The information can include (i) status and capabilities of other network elements (including other network nodes and computing elements) and (ii) status and traffic condition on each of the links 130. In some embodiments, the network fabric application that is executed in each of the nodes 120 can set up a management channel to communicate information of the node (e.g., the status and capabilities of its respective node) with each other.

Conventionally, only the physical layer has access to certain information about the physical links 130 (e.g., characteristics, status, load, physical channel information, etc.). Thus, in the conventional node architecture such as the ones shown in FIG. 3, only devices 305A and 305B would have such information. As mentioned above, these devices are independently operated and do not share resources or information with each other. Thus, if a network fabric application that couples to the application layer is installed under this conventional architecture (such as implemented within device 315A and 315B), the network fabric application would not have information regarding the physical links to facilitate efficient provision of network fabrics.

Therefore, a new node architecture different from the one shown in FIG. 3 is contemplated that allows the network fabric application to efficiently provision network fabrics. In this new architecture, the functionalities and features for the physical layer (layers 0/1), the aggregated layer (layers 2/3/4), and the upper layers (session layer, presentation layer, and application layer) of the OSI model are implemented within the same integrated device (equipment).

Figure 4:
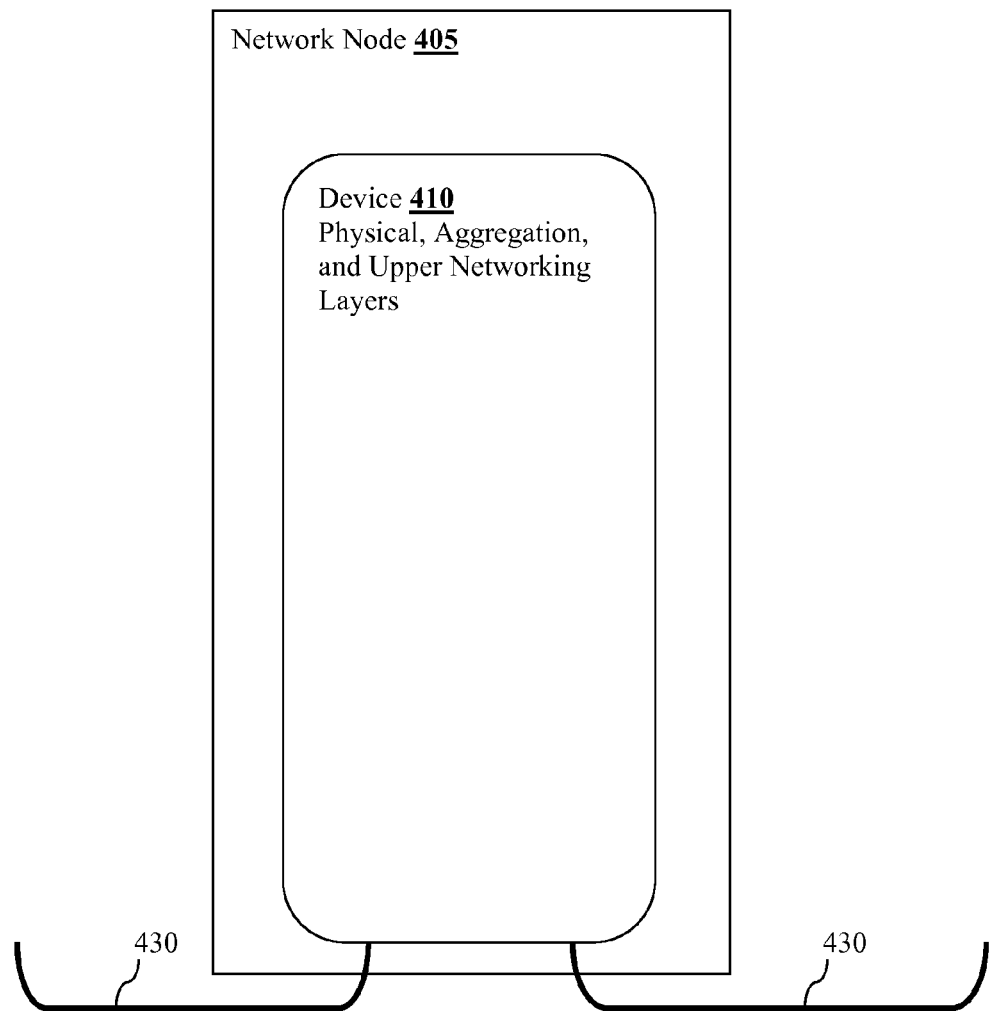
FIG. 4 illustrates an exemplary network node that comprises an integrated device having hardware and software that implements functionalities and features according to the physical layer (layer 0/1), the aggregate layer (layers 2/3/4), and any upper layers (session layer, presentation layer, and application layer) of the OSI models.

FIG. 4 illustrates an examples network node 405 that is built under this new architecture. As shown, node 405 has an integrated device 410 having hardware and software that implements functionalities and features according to the physical layer (layer 0/1), the aggregate layer (layers 2/3/4), and any upper layers (session layer, presentation layer, and application layer) of the OSI models. Because device 410 is an integrated device, different software modules that implement the different OSI layers within the device can communicate, share resources, and share information with each other. It is noted that the architecture describes for node 405 herein can be applied to any nodes 120A through 120L in the network 100.

Figure 5:
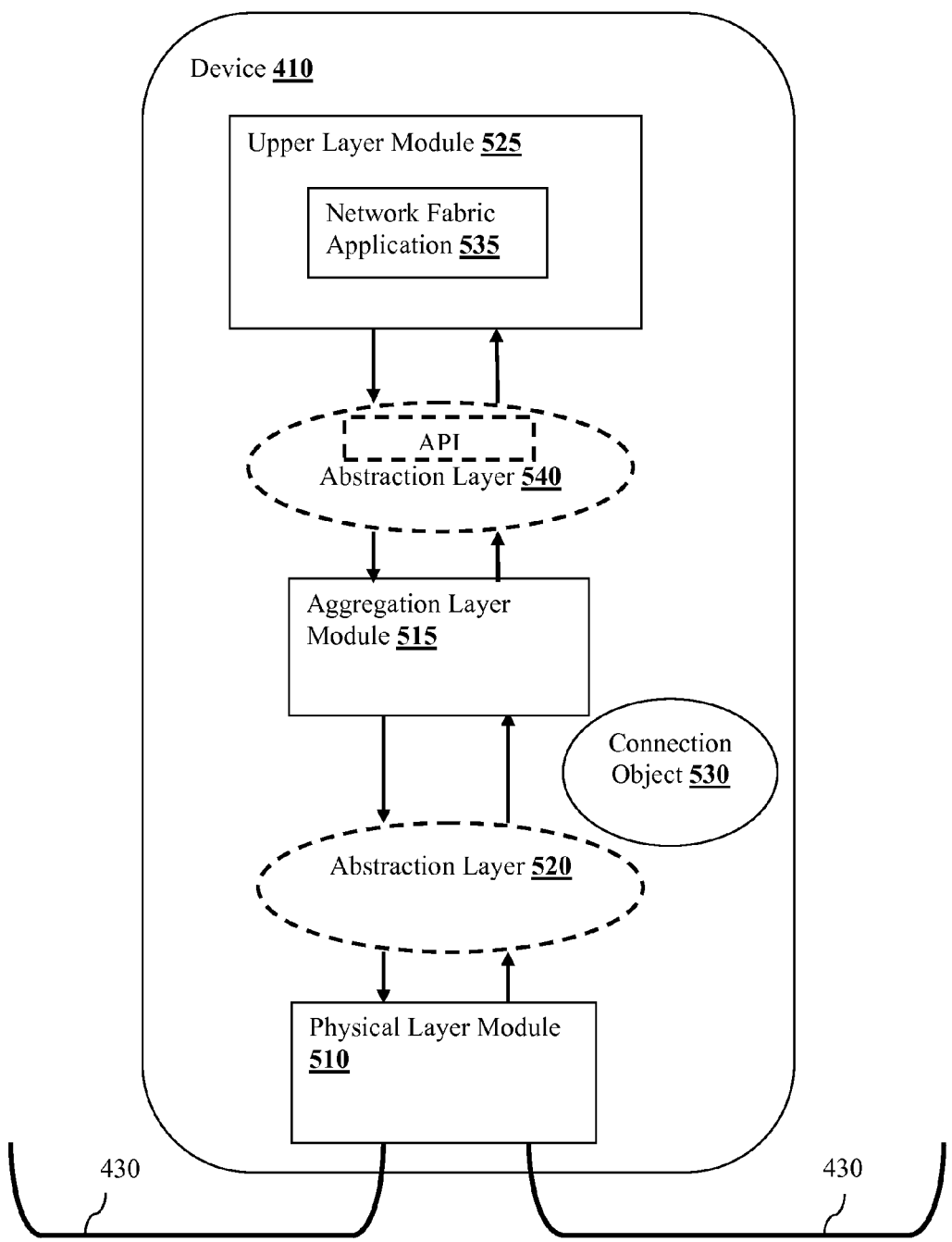
FIG. 5 illustrates an exemplary software architecture.

FIG. 5 illustrates an example software architecture that can be implemented within device 410. Specifically, device 410 includes physical layer module 510 that implements functionalities and features according to the physical layer (layers 0/1) of the OSI model, aggregation layer module 515 that implements functionalities and features according to the aggregation layer (layers 2/3/4) of the OSI model, and an upper layer module 525 that implements functionalities and features according to the session layer, the presentation layer, and the application layer (layers 5/6/7) of the OSI model. Each of the physical layer module 510, the aggregation layer module 515, and upper layer module 525 can include one or more different sub-modules that work in concert to perform the functionalities and features described herein.

In some embodiments, the network fabric application 535 is implemented within the upper layer module 525, as shown in the FIG. 5. The network fabric application 535 can then communicate internally with the software modules that implement the session layer, the presentation layer, and/or the application layer through internal APIs. In other embodiments, the network fabric application 535 can be implemented on top of the upper layer module 525 (e.g., as an application that is running on top of the operating system of the network node 405), and is communicatively coupled to the software module that implements the application layer within the upper layer module 525.

It is contemplated that a first abstraction layer (abstraction layer 520) can be added between the physical layer module 510 and aggregation layer module 515 and a second abstraction layer (abstraction layer 540) can be added between the aggregation layer module 515 and the upper layer module 525. Each of the abstraction layers 520 and 540 can be implemented as one or more software modules. The abstraction layer 520 is configured to facilitate the communication of information and/or instructions between the physical layer module 510 and aggregation layer module 515, while the abstraction layer 540 is configured to facilitate the communication of information and/or instructions between the upper layer module 525 and aggregation layer module 515. The abstraction layers 520 and 540 work together to allow the network fabric application that couples to the application layer to have access to information of the physical links 430 via the physical layer module 510.

In some embodiments, the abstraction layers 520 and 540 can provide different services for the network fabric application 535. For example, the abstraction layer 520 can retrieve information about the physical links 430 from the physical layer module 510 and pass the information to the network fabric application 535 via the aggregation layer module 515 and the abstraction layer 540. In some embodiments, the abstraction layer 520 retrieves status (e.g., up or down) of at least some of the links within network 100, traffic condition of at least some of the links within network 100, and also allocation (and assignment) information of the channels for at least some of the links within network 100. In some embodiments, the abstraction layer 520 instantiates a connection object (such as connection object 530), encapsulates the links information (e.g., status, traffic condition, and allocation information, etc.) within the connection object 530, and then passes the connection object 530 to the aggregation layer module 515 and the abstraction layer 540.

Figure 6:
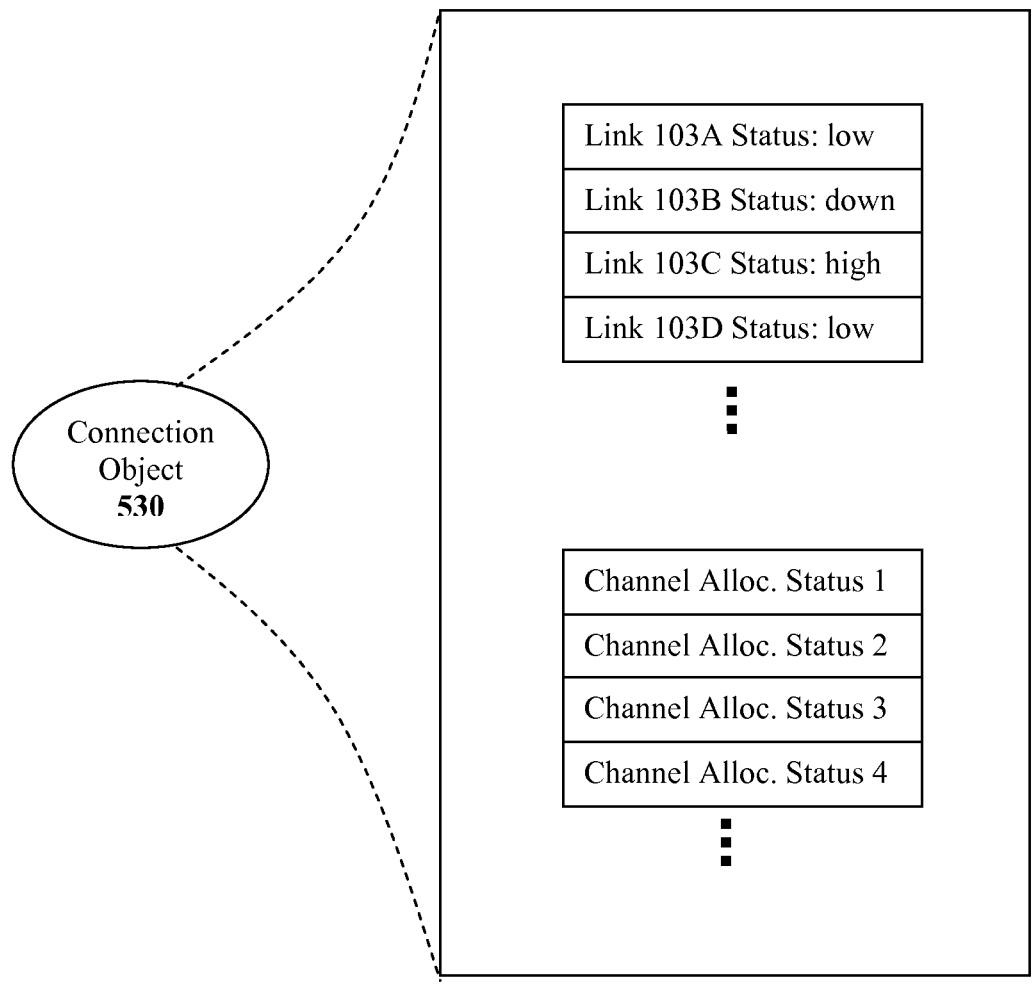
FIG. 6 illustrates an exemplary connection object that is created by an abstraction layer.

FIG. 6 illustrates an example connection object 530 that is created by the abstraction layer. Connection object 530 includes different attributes that represent status information, traffic condition information, and physical channels allocation information of at least some of the physical links 130 within the network 100. As shown, the connection object 530 includes a link status for link 103A (e.g., indicating that the traffic is low), a link status for link 103B (e.g., indicating that the link is currently down), a link status for link 103C (e.g., indicating that the traffic is high), a link status for link 103D (e.g., indicating that the traffic is low), and so forth. The connection object 530 also includes channel allocation of the physical links within the network 100. In addition to these attributes, the connection object 530 can also include other attributes regarding the physical links within the network 100, such as latency information, security information (e.g., whether an attack has been detected, etc.).

Figure 7:
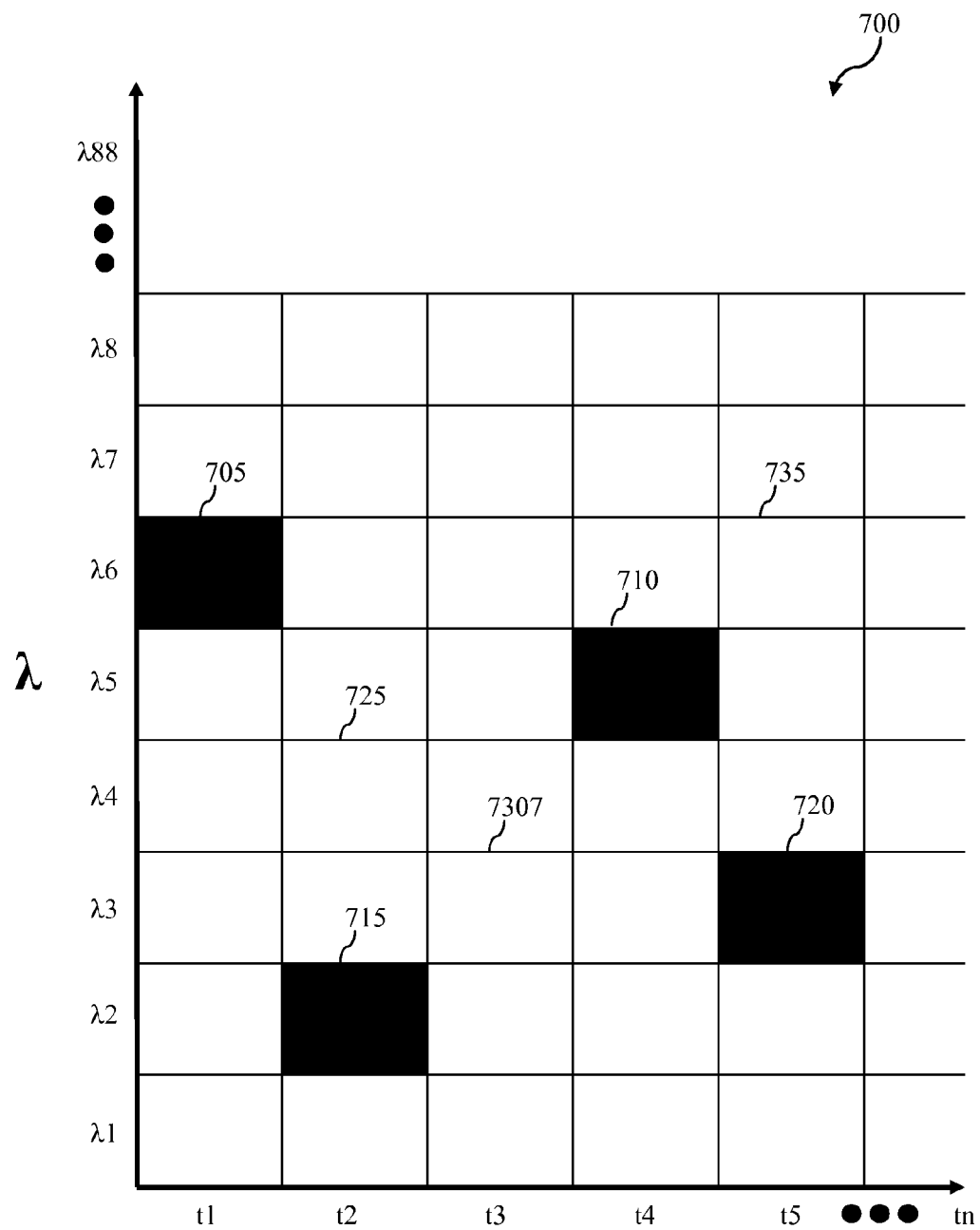
FIG. 7 is a two-dimensional graph that illustrates exemplary physical channels of a link.

As mentioned above, each of the physical links within the network 100 can include multiple physical channels, through divisions of the physical link by different wavelengths and different time slots. FIG. 7 illustrates example physical channels of a link by way of a graph 700 having two dimensions: a wavelength dimension along the y-axis and a time dimension along the x-axis. Each block (such as block 705, 725, and others) represent a different physical channel (specified by a particular wavelength and a particular timeslot) within the link.

Since each block within the graphical representation 700 represents a single channel, each block can include information such as allocation information and information of the owner of the channel. FIG. 7 illustrates one way of indicating allocation information within the graphical representation 700. As shown, the block 705 (representing the channel that occupies wavelength $\lambda 6$ and time slot t1) has been allocated, as indicated by the grayed out of the block 705. Similarly, blocks 710 (representing the channel that occupies wavelength $\lambda 5$ and time slot t4), blocks 715 (representing the channel that occupies wavelength $\lambda 2$ and time slot t2), and blocks 720 (representing the channel that occupies wavelength $\lambda 3$ and time slot t5) are also indicated as allocated. By contrast, block 725 (representing the channel that occupies wavelength $\lambda 5$ and time slot t2), block 730 (representing the channel that occupies wavelength $\lambda 4$ and time slot t3), and block 735 (representing the channel that occupies wavelength $\lambda 6$ and time slot t5) have not been allocated as these blocks are not grayed out.

In some embodiments, the connection object 530 can include data that represents similar information as represented by the graphical representation 700 for each link within network 100. The data can also include owner's information for each allocated channel (e.g., the computing process to which the channel has been allocated).

As mentioned above, the abstraction layer 520 passes the connection object 530 to the aggregation layer module 515 and the abstraction layer 540. With the connection object 530, the abstraction layer 540 can access information about the physical links of the network 100. In some embodiments, the abstraction layer 540 can provide information of the physical links of the network 100 to the network fabric application 535 through a set of APIs. In some embodiments, the network fabric application 535 can present this information to a user via a user interface and a display or present the information to another process that has access to the network node 405.

In some embodiments, the set of APIs provided by the abstraction layer 540 also allows the network fabric application 535 to provide instructions to configure at least one connection link within the network 100. An advantage of this approach is that the connection object allows the network fabric application to use the information about the physical links to provision the network fabric. For example, the network fabric application 535 can avoid including links that are down or that have high traffic within the network fabric. The network fabric application 535 can also provide this link and node information to the users and/or processes (by providing an interface to the users/processes) so that the users and/or processes can use this information to create a network fabric configuration.

Thus, the network fabric application 535 can use the information about the network (e.g., the status, traffic condition, latency information, channel allocation of each link within the network 100) to efficiently configure (or allow the user or the other process to configure) at least one network connection link within the network. The network fabric application 535 can provide the instructions to configure the network 100 to the abstraction layer 540 through API calls. In some embodiments, the set of APIs allows the network fabric application 535 to add an addition link to, and remove a link from, the network fabric 230. In some embodiments, the set of APIs also allows the network fabric application 535 to allocate (or de-allocate) one or more channels within a link to a particular computing process. Since the network fabric application 535 has access to channel allocation and assignment information of the links within the network 100, this allows the network fabric application 535 to be more efficiently making use of the bandwidth of the links within the network fabric 230. For example, the network fabric application 535 can allocate more physical channels to a computing process that requires larger bandwidth and in a higher priority and allocate less physical channels to another computing process that requires less bandwidth and in a lower priority.

As mentioned above, a network fabric configuration specifies multiple network paths between each pair of computing elements. Thus, with the features (information and APIs) provided by the abstraction layer 540, the network fabric application 535 can associate (allocate) each network path in the network fabric with a physical channel. In some embodiments, the network fabric application 535 can associate (allocate) more than one physical channel in aggregate with a network path to increase the overall bandwidth of the network path.

Knowing the exact number of available physical channels in the links also allows the network fabric application 535 to dynamically allocate physical channels to different processes and different paths (e.g., optical burst switching). For example, the network fabric application 535 can also allow a user to configure a network fabric in a way that allocates additional physical channels to a process only during a period of time when extra bandwidth is needed. Thus, the network fabric application 535 can configure the network fabric such that only 3 physical channels are allocated to the process most of the time but as many as 10 physical channels would be allocated to the same process during a predetermined period of peak hours.

In some embodiments, the network fabric application 535 can also modify the network fabric 230 once it is provisioned. There are many reasons to do so. For example, the status and traffic condition of the links 130 within the network fabric 230 can change from time to time, some processes have different demands for bandwidth over time, and addition or removal of computing elements, to name just a few. Modification to the network fabric can include addition and/or removal of network nodes, addition and/or removal of network links, changing the paths of the multiple paths between a pair of computing elements, etc. Thus, the network fabric application 535 can automatically, or upon instructions from the user and/or processes (users/processes provide an updated network fabric configuration to the network fabric application), modify the network fabric by changing the network fabric configuration, and provisioning the modified network fabric via the connection object.

Once provisioned, a network fabric can provide high-speed transmission of data among nodes and elements within the fabric. As mentioned above, an image file that encapsulates information about the network fabric configuration is distributed to all elements within the network fabric 230. Thus, each element within the fabric is self-aware (e.g., knowing the condition of the entire fabric and its own position within the fabric), allowing efficient routing and management of the fabric 230. In some embodiments, the entire fabric 230 (that includes the interconnected computing elements and network nodes) can be viewed as a single giant computing machine (e.g., a load-distributed computer, etc.) from the perspective of someone from outside of the fabric. In some of these embodiments, the entire fabric 230 can have one single Internet Protocol address (IP address) for communicating with computers/networks outside of the fabric.

These and other characteristics of network fabrics give rise to novel and useful applications. One contemplated application is to have a high-speed trading platform that is built based on a network fabric. One of the requirements for any high-speed trading platform is to minimize the output latency (latency in executing a transaction based on known relevant information). This latency comes from two areas: (1) the time it takes for the relevant information to travel from its source to the processing unit (e.g., a server, etc.) whose responsibility is to take the relevant information and make a decision on the trade and (2) the time it takes for the processing unit to make a decision on the trade once information is received.

The security trading algorithms used by investment organizations (e.g., hedge fund companies, investment banks, sophisticated investors, etc.) are often very complicated that require thousands or millions of computer operations. Thus, the second issue can be resolved by investing in very powerful servers that can perform the operations in the shortest amount of time. For the first issue, many investment organizations have tried to optimize their performance by putting the servers that execute the security trading algorithms as near as the information source as possible (e.g., in a room right next to the New York Stock Exchange, etc.). However, this solution only works when the security trading algorithms only rely on information coming from the New York Stock Exchange and nowhere else. For example, if the algorithm requires information from New York Stock Exchange and also information from the Japanese Stock Exchange, even if the server can acquire information from the New York Stock Exchange almost immediately after the information is released, the server still has to wait for information from the Japanese Stock Exchange before it can execute the algorithm.

Figure 8:
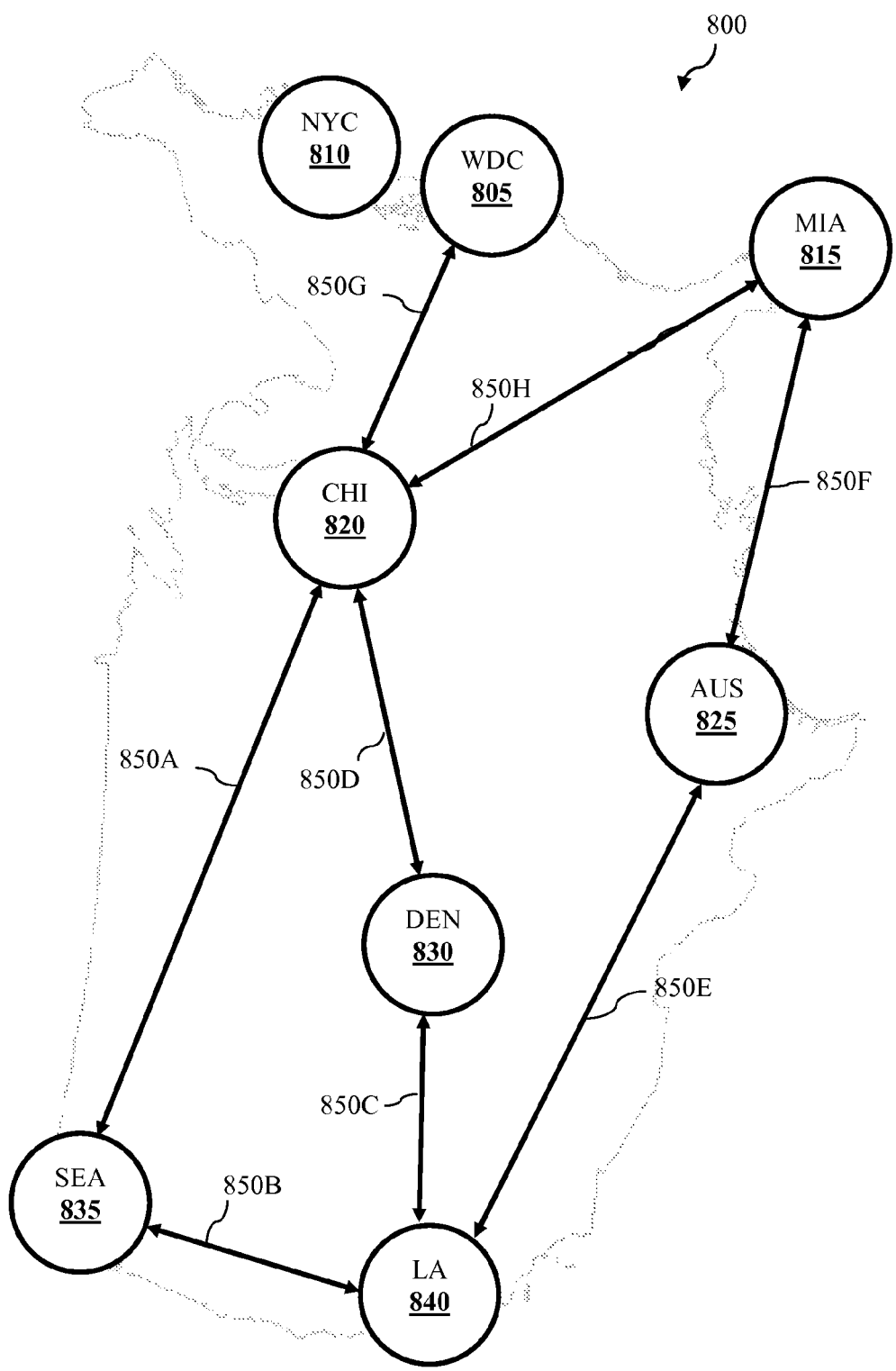
FIG. 8 illustrates an example network fabric used as a high-speed trading platform.

In one aspect of the invention, using the network fabric to build a security trading platform can resolve the issue illustrated above. FIG. 8 illustrates an example network fabric 800 that is being used as a high-speed trading platform. The network fabric 800 includes eight elements that are dispersed across the United States. The elements of fabric 800 include element 805 that is located in Washington D.C., element 810 located in New York City, element 815 located in Miami, element 820 located in Chicago, element 825 located in Austin, element 830 located in Denver, element 835 located in Seattle, and element 840 located in Los Angeles. These elements are connected with each other through links 850A through 850K.

Each of these elements (elements 805-840) can have the same/similar structure as network node 405 of FIG. 4. In addition, each of these elements (elements 805-840) has sufficient computing resources (e.g., processing power, memory, etc.) to perform computational intense processing (e.g., security trading algorithms, etc.) in addition to basic routing functions for network fabric 800. In an exemplary aspect, a subset of the processing resources is dedicated to routing functionalities and a different subset of the processing resources is dedicated to other computational intense processing. For example, an element can include an eight-core processor, from which the element can allocate two of the cores to perform basic routing functionalities for the fabric 800 and allocate the other six cores to perform the computational intense processing.

With a high-speed trading platform that is built based on such a network fabric, one has the option to have the security trading algorithms to be performed anywhere (e.g., at any one of the elements 805-840), or to be distributed among two or more of the elements 805-840. It is also contemplated that different elements can be most optimal (e.g., in terms of speed) to perform the security trading algorithms in different instances. In other words, one of the elements can be the fastest (among all elements in the fabric 800) to come up with a trading decision (using the security trading algorithm) in each trading instance. There are many factors that can affect the determination of which element is the optimal (or fastest) in making a trading decision using the security trading algorithm. For example, the security trading algorithm often times requires data provided by different places (e.g., U.S. government data from different governmental departments, data from foreign companies/government, company news, etc.), and the time for the data to reach these different elements (805-840) within the fabric 800 can be different. Even though with the high-speed network fabric, the time difference for the elements to receive the data can be very tiny, in the case of security trading, any difference in time however small can be substantial.

In a simple example in which a trading decision cannot be made until data coming from Europe is released, the most optimal element to make the trading decision (perform the security trading algorithm) would probably be either element 805 that is located in Washington D.C. or element 810 located in New York, since they are closest to Europe and will have the least foreseeable latency in receiving the data from Europe. On the other hand, if the trading decision requires data coming from Japan, the most optimal element to make the trading decision (perform the security trading algorithm) would probably be either element 835 that is located in Seattle or element 840 located in Los Angeles, since they are closest to Japan and will have the least foreseeable latency in receiving the data from Japan.

In a more complicated example, the security trading platform has to wait for data coming from more than one place (e.g., must wait for data coming from both Europe and Japan) in order to make a trading decision using the security trading algorithm, and the origins are sending the different data out almost at the same time. In this case, the most optical element to make the trading decision (perform the security trading algorithm) would be one that would receive the data from the different sources at the same (or substantially the same) time (probably element 830 located in Denver or Element 825 located in Austin, since the distances between these locations and Europe and between these locations and Japan are about the same). In addition to distances, conditions of the physical links 850A-850K (e.g., latency, traffic, status, etc.) can also affect the time it takes for the data to arrive at each element.

The estimation of time for the data to reach each of the elements 805-840 (taking into account distances and link condition) can be performed by any of the elements (or distributed among the elements). The computation can be performed shortly or immediately prior to the time that the required data is foreseeably transmitting from the sources.

In addition to distances and condition of the physical links, it is contemplated that the precision and accuracy of time-stamping a transaction can be a factor in determining which element to make the trade decision. The equipment that can precisely and accurately time-stamp a transaction can be complicated and costly. As such, the time-stamping equipments in the elements might not be identical—some might be more precise and accurate than others. Thus, the precision and accuracy to time-stamp a transaction of each element should also be taken into account in determining which element to perform the trading decision.

Although the security trading platform in this example uses fabric 800 that includes equipment that spans over the United States, other fabric that spans in a larger geographical area (e.g., a continent, the entire world) can be used. As illustrated above, one advantage of using such a network fabric for a security trading platform is to be able to dynamically determine the optical equipment (and location) to perform each trading decision.

Each of the elements (e.g., computing elements, network nodes, etc.) within the network 100 can include multiple processing units (e.g., multiple processors or multiple processing cores, etc.) for performing the routing functions for the fabric 230. The multiple processing units within each element do not have to be identical. In fact, a network element can include different processing units that are optimized to perform different networking functions. For example, a network element can include a set of processing units (e.g., Broadcom 565xx series) that are optimized to reduce data transmission latency (e.g., by hardwiring the routing algorithm, perform low layer (layer 2) protocol data transmissions, etc.) and another set of processing units (e.g., Broadcom 566xx series) that are optimized to perform certain networking features (e.g., perform high layer (layer 7 to 2) protocols data transmission, etc.) such as voice-over-IP, HTTP, FTP, database operations, port scanning, transferring files, and security capabilities. These different processing units can be connected to (and controlled by) a general processing core (e.g., Broadcom 568xx series) via an internal bus. This way, a network element can connect a subset of its ports with the processing units that are optimized to reduce data transmission latency and connect another subset of its ports with the processing units that are optimized to perform rich networking features, and use the different ports for different types of data transmissions.

Figure 9:
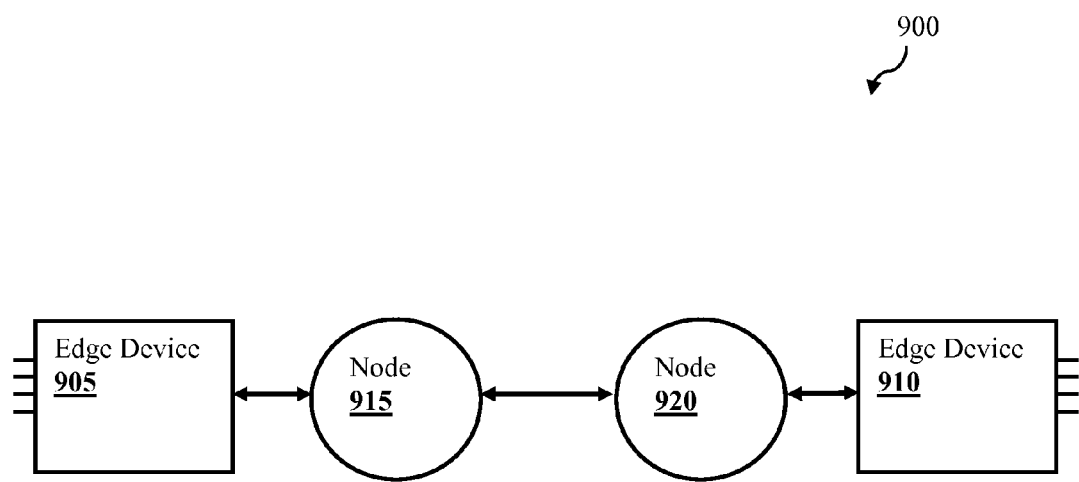
FIG. 9 illustrates an exemplary use of different types of processing units within each element in network fabric.

FIG. 9 illustrates an example of making use of the different types of processing units within each element within network fabric 900. Network fabric 900 includes four elements: edge device 905, node 915, node 920, and edge device 910. The two edge devices 905 and 910 are connected to each other via network nodes 915 and 920. In addition, the two edge devices 905 and 910 are also connected to external devices that would use the fabric 900 to communicate (e.g., file transfer, web service, etc) with each other.

Each of the elements 905-920 have multiple processing units that are specialized in different types of networking functions. For example, each of edge elements 905-920 include a set of processing unit that are optimized to reduce data transmission latency and another set of ports that are optimized to perform certain networking features (e.g., FTP file transfer, HTTP web services, etc.). Thus, the edge devices 905 and 910 can be configured to use the ports that are connected to the processing units optimized to perform rich networking features to connect with external devices, and to use the ports that are connected to the processing units optimized to reduce transmission latency to connect with the network nodes within the fabric 900. The network nodes 915 and 920 can use the ports that are connected to the processing units optimized to reduce transmission latency to connect with each other and the edge devices. As a result, the fabric 900 includes a latency optimized back haul for fast data transmission within the fabric, and also edge devices that are optimized to process feature rich networking requests made by external devices.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A network device communicatively connected to other network devices via at least one network connection in a networking fabric, the network device comprising:
   a physical layer device;
   an aggregation layer device;
   an upper layer device; and
   a non-transitory computer-readable memory having software instructions stored thereon, the software instructions executable by a processor to perform a method, the software codes comprising:
      a first fabric abstraction layer communicatively coupled between the physical layer device and the aggregation layer device and configured to receive information about physical links from the physical layer device; and
      a second fabric abstraction layer coupled between the upper layer device and the aggregation layer device, the second fabric abstraction layer comprising an application programming interface (API), the first fabric abstraction layer communicating the information about the physical links to a network fabric application configured to generate configuration instructions based on the information about the physical links to configure the at least one network connection, the second fabric abstraction layer configured to communicate the configuration instructions from the network fabric application to the first abstraction layer via a data link layer, the first abstraction layer providing for configuring the at least one network connection to transmit data according to the configuration instructions.

2. The network device of claim 1, wherein the physical layer device comprises at least one of a hub, a repeater, and a network interface cards; the aggregation layer device comprises at least one of a bridge, a switch, a router, and an Ethernet card; and the upper layer device comprises at least one of a web server, an e-mail server, and a voice over IP server.

3. The network device of claim 1, wherein the network connection comprises multiple physical channels.

4. The network device of claim 3, wherein the multiple physical channels comprises a wavelength dimension and a time dimension.

5. The network device of claim 4, wherein the multiple physical channels comprises at least 88 physical channels at each time slice, wherein each of the at least 88 channels has a distinct optical wavelength.

6. The network device of claim 3, wherein each of the at least 88 physical channel has a bandwidth of at least 100 Gb.

7. The network device of claim 3, further comprising dividing the network connection into the multiple physical channels using wavelength division multiplexing (WDM) and time division multiple access (TDMA).

8. The network device of claim 3, wherein the first fabric abstraction layer is configured to retrieve channel status information of the network connection and provide the network fabric application with access to the channel status information via the API.

9. The network device of claim 8, wherein the channel status information comprises availabilities of the multiple physical channels.

10. The network device of claim 8, wherein the network fabric application is configured for generating the configuration instructions based on the channel status information.

11. The network device of claim 10, wherein generating the configuration instructions comprises assigning an available physical channel to a process managed by the network fabric application.

12. The network device of claim 10, wherein generating the configuration instructions comprises assigning an aggregation of more than one available physical channel to a process managed by the network fabric application.

13. The network device of claim 1, wherein the second fabric abstraction layer is configured to receive a modification to the configuration instructions generated by the network fabric application; and wherein the first abstraction layer is configured to adapt the network connection to transmit data according to the modified configuration instructions.

14. The network device of claim 13, wherein the modified configuration instructions comprises a re-assignment of a physical channel that was assigned to a first process to a second different process managed by the network fabric application.

15. The network device of claim 1, wherein the network fabric application comprises at least one of an operating system and an Ethernet driver.

16. The network device of claim 1, wherein the configuration instructions are defined based on at least one of the following: a security template, a database template, and a computational template.

* * * * *